US012634996B2

(12) United States Patent
Izadinasab et al.

(10) Patent No.: US 12,634,996 B2
(45) Date of Patent: May 19, 2026

(54) DISTANCE-BASED PHYSICAL RANDOM-ACCESS CHANNEL ROOT SEQUENCE ALLOCATION TO FACILITATE CELL RANGE IMPROVEMENT

(71) Applicant: Dell Products, L.P., Round Rock, TX (US)

(72) Inventors: Kazem Izadinasab, Kitchener (CA); Eran Goldstein, Montreal (CA); Evgeny Paltin, Montreal (CA); Jayaram Venguduswamy Srinivasan, Nepean (CA)

(73) Assignee: Dell Products L.P., Round Rock, TX (US)

( * ) Notice: Subject to any disclaimer, the term of this patent is extended or adjusted under 35 U.S.C. 154(b) by 348 days.

(21) Appl. No.: 18/340,798

(22) Filed: Jun. 23, 2023

(65) Prior Publication Data

US 2024/0430939 A1     Dec. 26, 2024

(51) Int. Cl.
*H04W 74/0833*        (2024.01)
*H04W 74/08*          (2024.01)

(52) U.S. Cl.
CPC ... *H04W 74/0833* (2013.01); *H04W 74/0866* (2013.01)

(58) Field of Classification Search
CPC ..................... H04W 74/0833; H04W 74/0866
USPC ....................................................... 370/329
See application file for complete search history.

(56) References Cited

U.S. PATENT DOCUMENTS 11,979,919 B2 *   5/2024   Saha ................... H04L 27/2607
2021/0014900 A1   1/2021   Lei et al.
2021/0385879 A1   12/2021  Mahalingam et al.

FOREIGN PATENT DOCUMENTS

WO      WO-2023052569 A1 *   4/2023   ........ H04W 74/0833

OTHER PUBLICATIONS

International Search Report and Written Opinion for PCT Application No. PCT/US2023/036202 mailed Feb. 21, 2024, 14 pages.
(Continued)

*Primary Examiner* — Asad M Nawaz
*Assistant Examiner* — Hugh Mark Ashley
(74) *Attorney, Agent, or Firm* — Amin, Turocy & Watson, LLP

(57)                ABSTRACT

Distance-based physical random-access channel (PRACH) root sequence allocation to facilitate cell range improvement is presented herein. A system determines a cell range of a wireless access point; divides root sequences into respective groups of root sequences, and divides such groups of root sequences between a first group of user equipments that are located within the cell range and a second group of user equipments that are located outside of the cell range; determines a first detection window size for the first group of user equipments, and a second detection window size for the second group of user equipments—the second detection window size being greater than the first detection window size to facilitate an increase of the cell range; and receives, from a user equipment via the second detection window size and the second group of root sequences, a PRACH-based communication to facilitate the increase of the cell range.

20 Claims, 14 Drawing Sheets

100 ⟶

101 ⟶

DISTANCE-BASED PHYSICAL RANDOM-ACCESS CHANNEL (PRACH) ROOT SEQUENCE ALLOCATION SYSTEM 110

120

130

(56) References Cited

OTHER PUBLICATIONS

Technical specifications (TS) 38.211—"5G; NR; Physical channels and modulation", 3GPP TS 38.211 version 16.2.0 Release 16, Jul. 2020, 136 pages.

"5G RACH In a Nutshell" ShareTechnote. [https://www.sharetechnote.com/html/5G/5G_RACH.html] retrieved Oct. 29, 2023, 119 pages.

Chakrapani, Arvind. "On the Design Details of SS/PBCH, Signal Generation and PRACH in 5G-NR" IEEE Access, vol. 8, 2020, 21 pages.

"5G; NR; Physical channels and modulation" 3GPP TS 38.211 version 15.8.0 Release 15, Jan. 2020, 100 pages.

Notification Concerning Transmittal of International Preliminary Report on Patentability mailed Jan. 2, 2026 for PCT Application No. PCT/US2023/036202, 9 pages.

European Office Action mailed Jan. 30, 2026 for European Patent Application No. 23813507.3, 3 pages.

* cited by examiner

Figure 2:
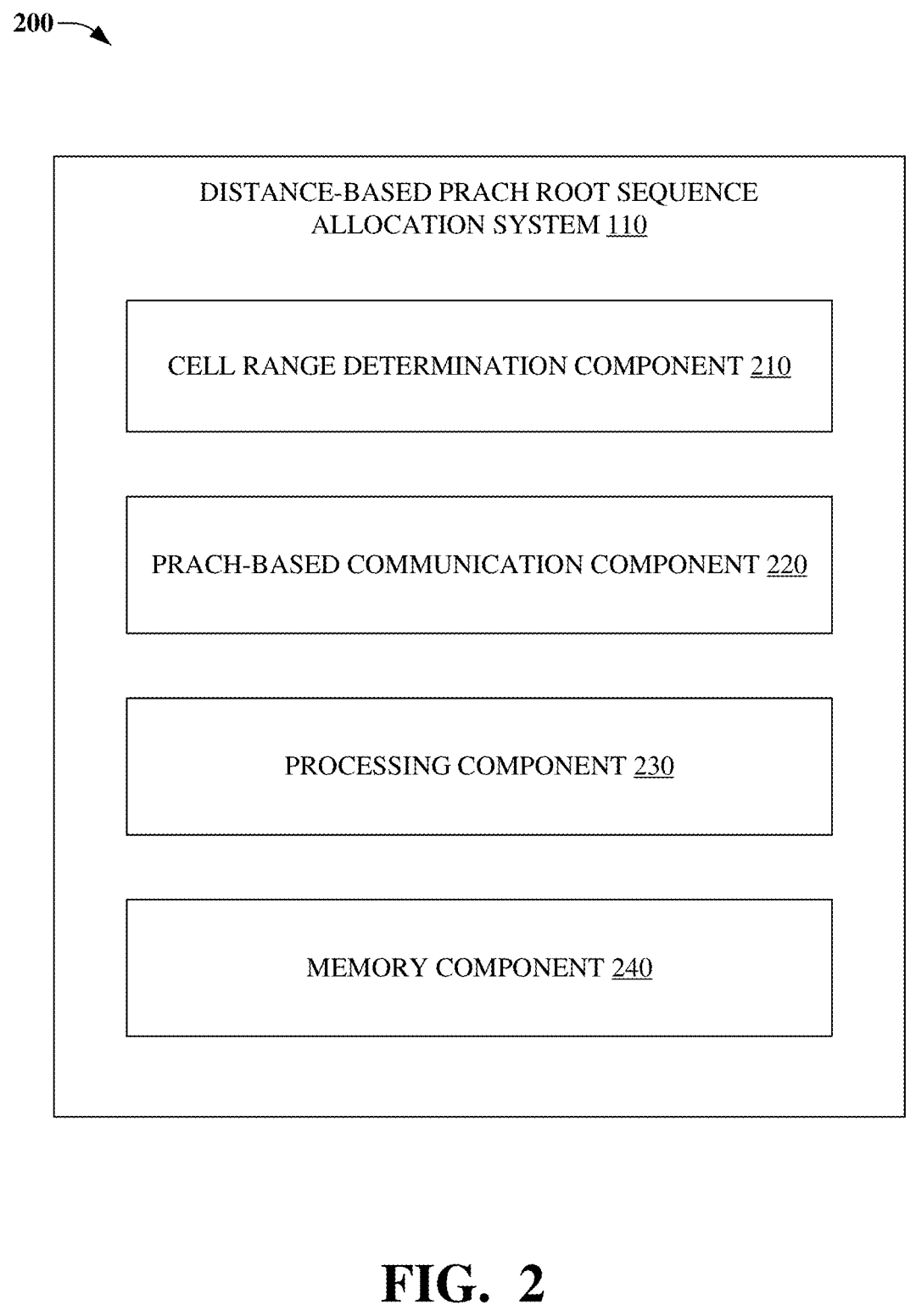

200

DISTANCE-BASED PRACH ROOT SEQUENCE
ALLOCATION SYSTEM 110

CELL RANGE DETERMINATION COMPONENT 210

PRACH-BASED COMMUNICATION COMPONENT 220

PROCESSING COMPONENT 230

MEMORY COMPONENT 240

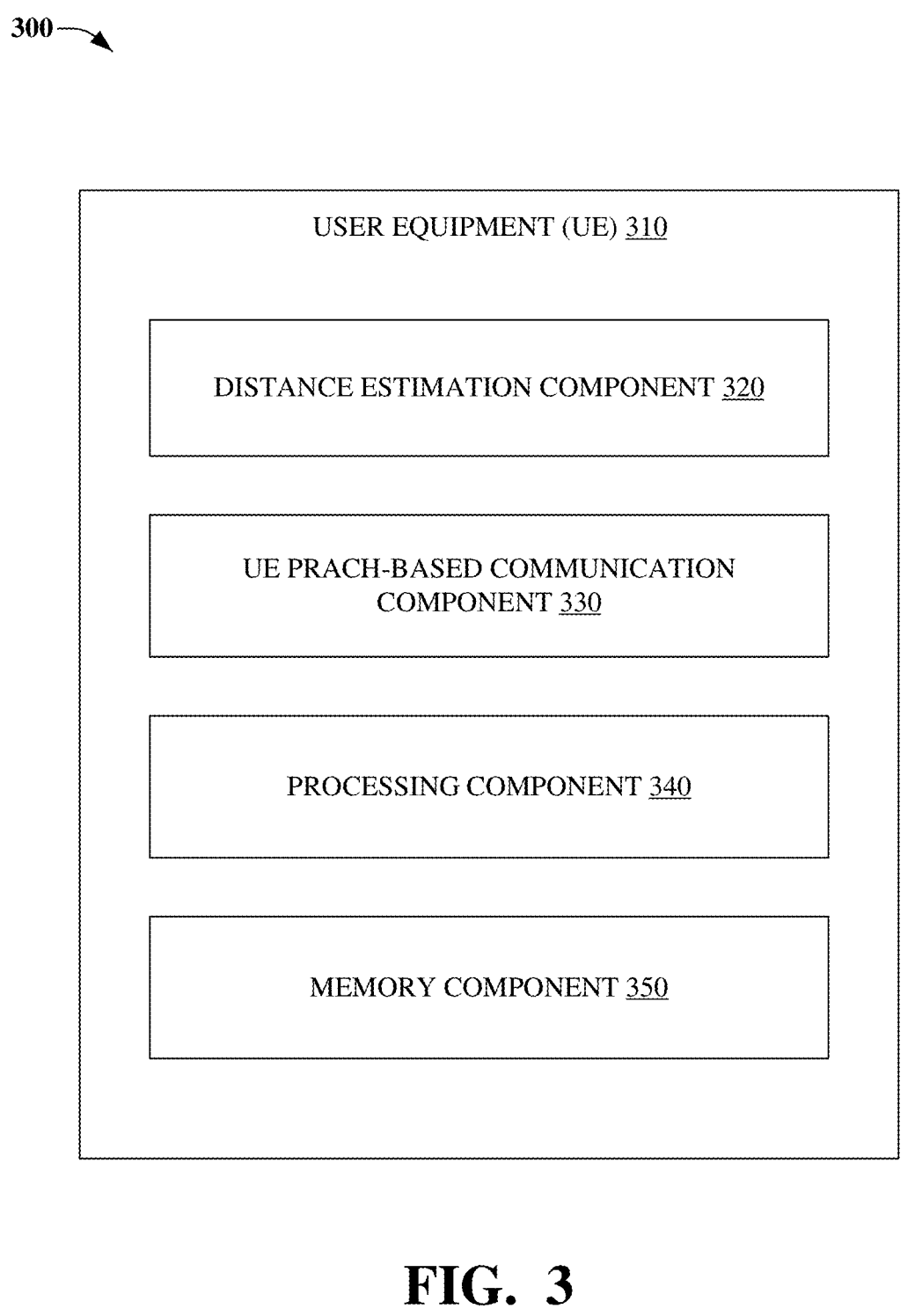

USER EQUIPMENT (UE) 310

DISTANCE ESTIMATION COMPONENT 320

UE PRACH-BASED COMMUNICATION COMPONENT 330

PROCESSING COMPONENT 340

MEMORY COMPONENT 350

FIG. 3

| ZCZC index | $N_{cs}$ for Group 2 | Total number of preambles for Group 1 ($N_{cs}=19$) | Total number of preambles for Group 2 | Total number of preambles for Group 1 & 2 | Cell range | Improvement in cell range |
|---|---|---|---|---|---|---|
| 11 | 23 | 35 | 29 | 64 | 592.5 | 32.07% |
| 12 | 27 | 35 | 25 | 60 | 736.47 | 64.13% |
| 13 | 34 | 35 | 20 | 55 | 988.27 | 120.25% |
| 14 | 46 | 35 | 15 | 50 | 1419.9 | 216.45% |
| 15 | 69 | 35 | 10 | 40 | 2247.3 | 400.84% |

400

600 —

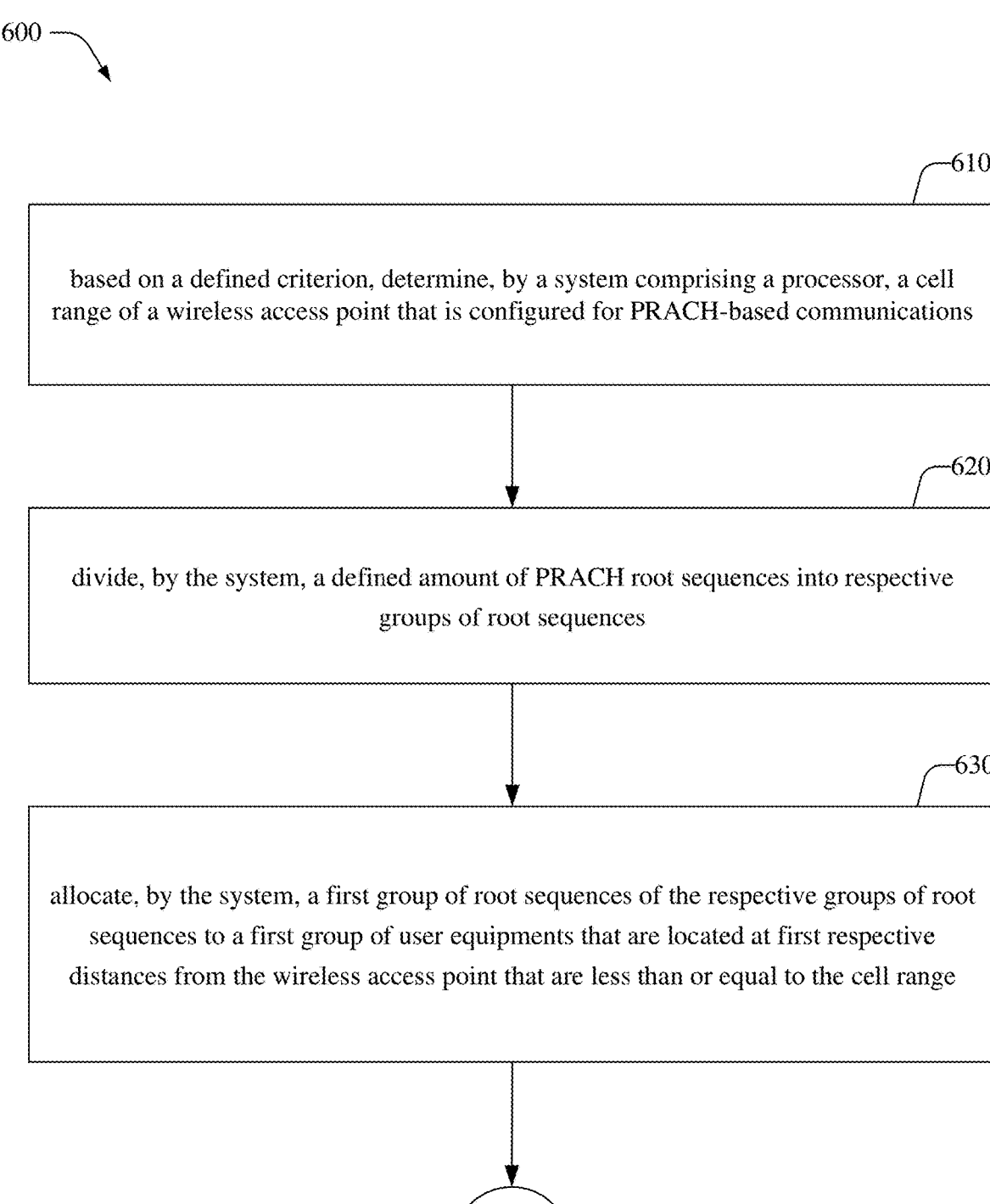

610 based on a defined criterion, determine, by a system comprising a processor, a cell range of a wireless access point that is configured for PRACH-based communications

620 divide, by the system, a defined amount of PRACH root sequences into respective groups of root sequences

630 allocate, by the system, a first group of root sequences of the respective groups of root sequences to a first group of user equipments that are located at first respective distances from the wireless access point that are less than or equal to the cell range

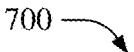

700

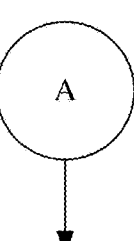

A

┌─────────────────────────────────────────────────────────────────────┐ ─710
│ allocate, by the system, a second group of root sequences of the respective groups of │
│ root sequences to a second group of user equipments that are located at second │
│ respective distances from the wireless access point that are greater than the cell range │
└─────────────────────────────────────────────────────────────────────┘

┌─────────────────────────────────────────────────────────────────────┐ ─720
│ determine, by the system, a first detection window size for first respective PRACH- │
│ based communications corresponding to the first group of user equipments │
└─────────────────────────────────────────────────────────────────────┘

┌─────────────────────────────────────────────────────────────────────┐ ─730
│ determine, by the system, a second detection window size for second respective │
│ PRACH-based communications corresponding to the second group of user equipments, │
│ in which the second detection window size is greater than the first detection window │
│ size to facilitate an increase of the cell range of the wireless access point │
└─────────────────────────────────────────────────────────────────────┘

┌─────────────────────────────────────────────────────────────────────┐ ─740
│ receive, by the system from a user equipment via the second detection window size and │
│ the second group of root sequences, a PRACH-based communication to facilitate the │
│ increase of the cell range of the wireless access point, in which a distance between the │
│ user equipment and the wireless access point has been estimated by the user equipment │
│ to be greater than the cell range of the wireless access point │
└─────────────────────────────────────────────────────────────────────┘

FIG. 7

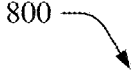

800 ⌐

⌐810 determine, by a system comprising a processor, a cell range of a wireless access point that is configured for PRACH-based communications

⌐820 allocate, by the system, root sequences to respective groups of root sequences, in which a first group of root sequences of the respective groups of root sequences corresponds to a first group of wireless devices that are located at first respective distances from the wireless access point that are greater than the cell range, and in which a second group of root sequences of the respective groups of root sequences corresponds to a second group of wireless devices that are located at second respective distances from the wireless access point that are less than or equal to the cell range

⌐830 determine, by the system, a first number of cyclic shifts per root sequence for first respective PRACH-based communications that are associated with the first group of wireless devices that are located at the first respective distances from the wireless access point that are greater than the cell range

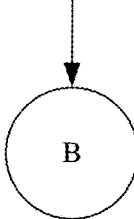

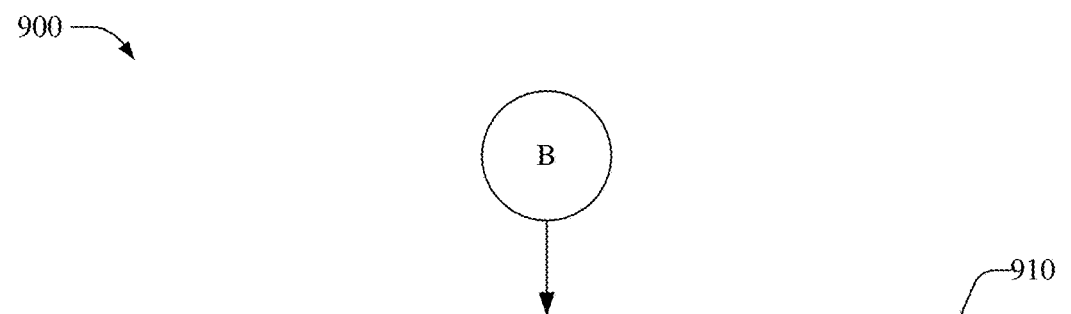

B

910 determine, by the system, a second number of cyclic shifts per root sequence for second respective PRACH-based communications that are associated with the second group of wireless devices that are located at the second respective distances from the wireless access point that are less than or equal to the cell range, in which the first number of cyclic shifts per root sequence for the first respective PRACH-based communications is smaller than the second number of cyclic shifts per root sequence for the second respective PRACH-based communications to facilitate an increase of the cell range of the wireless access point

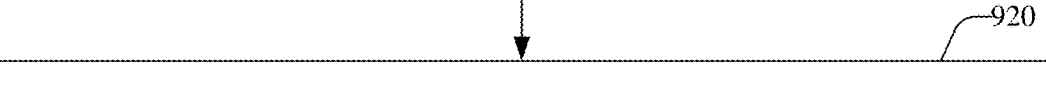

920 receive, by the system based on a first cyclic shifted version of the first group of root sequences corresponding to the first group of wireless devices that are located at first respective distances from the wireless access point that are greater than the cell range, a first PRACH-based communication from a first wireless device that has estimated a first distance between the first wireless device and the wireless access point to be greater than the cell range of the wireless access point

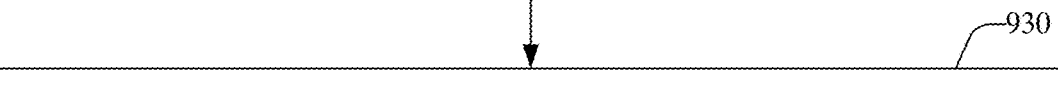

930 receive, by the system based on a second cyclic shifted version of the second group of root sequences corresponding to the second group of wireless devices, a second PRACH-based communication from a second wireless device that has estimated a second distance between the second wireless device and the wireless access point to be less than or equal to the cell range of the wireless access point

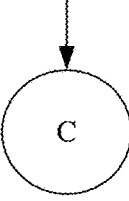

—1010 in response to a determination, via the second wireless device, that a failure in the second RACH-based communication has occurred, receive, by the system based on the first cyclic shift offset via the first group of root sequences that have been allocated to the first group of wireless devices, a third PRACH-based communication from the second wireless device

1100 —

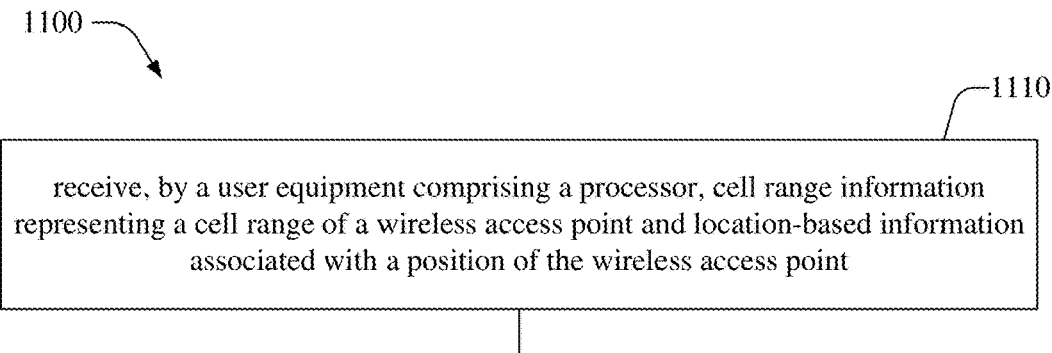

receive, by a user equipment comprising a processor, cell range information representing a cell range of a wireless access point and location-based information associated with a position of the wireless access point receive, by the user equipment, group root sequence information representing respective groups of PRACH-based root sequences comprising a first group of PRACH-based root sequences and a second group of PRACH-based root sequences, in which the first group of PRACH-based root sequences corresponds to a first group of wireless devices that are located at first respective distances from the wireless access point that are greater than the cell range, and in which the second group of PRACH-based root sequences corresponds to a second group of wireless devices that are located at second respective distances from the wireless access point that are less than or equal to the cell range receive, by the user equipment, detection window information representing a first detection window size for first respective PRACH-based communications corresponding to the first group of wireless devices that are located at the first respective distances from the wireless access point that are greater than the cell range, and representing a second detection window size for second respective PRACH-based communications corresponding to the second group of wireless devices that are located at second respective distances from the wireless access point that are less than or equal to the cell range

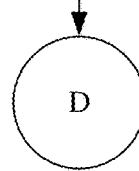

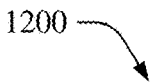

1200

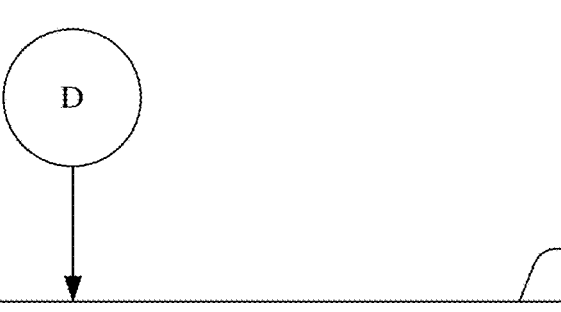

D

1210 based on the cell range information and the location-based information, estimate, by the user equipment, a distance between the user equipment and the wireless access point

1220 in response to a determination that the distance is greater than the cell range of the wireless access point, generate, by the user equipment based on the detection window information and the group root sequence information, a PRACH-based communication utilizing the first group of root sequences and the first detection window size, and send, by the user equipment, the PRACH-based communication to the wireless access point

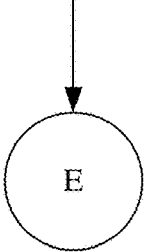

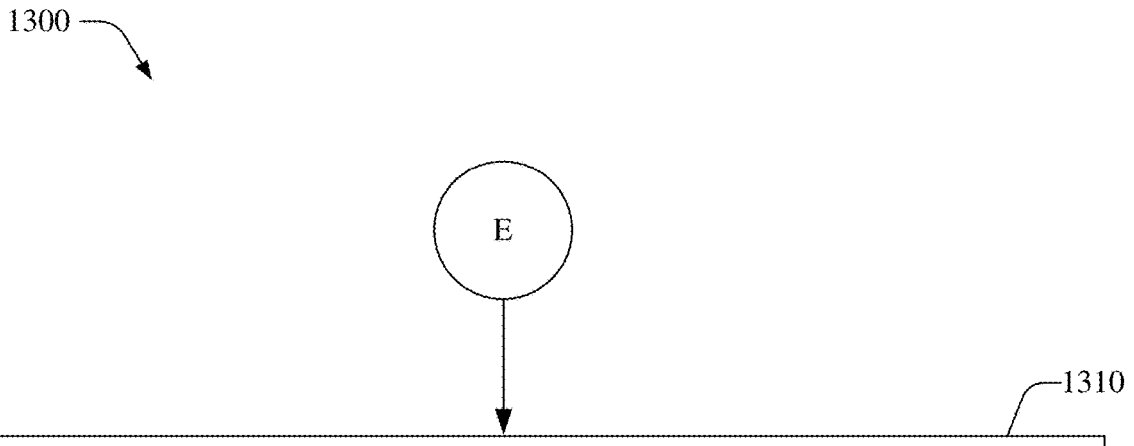

1310 in response to a determination that the distance is less than or equal to the cell range of the wireless access point, generate, by the user equipment based on the detection window information and the group root sequence information, a second PRACH-based communication utilizing the second group of root sequences and the second detection window size, and send, by the user equipment, the second PRACH-based communication to the wireless access point

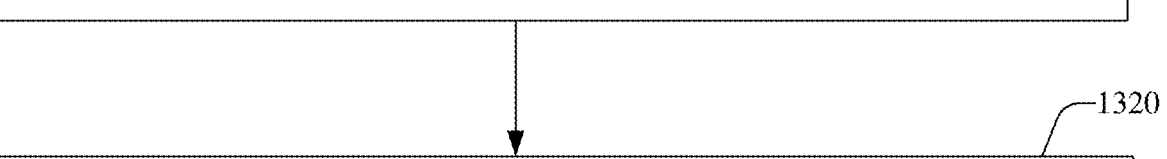

1320 in response to a determination that a failure in the second PRACH-based communication has occurred, generate, by the user equipment based on the detection window information and the group root sequence information, a third PRACH-based communication utilizing the first group of root sequences and the first detection window size, and send, by the user equipment, the third PRACH-based communication to the wireless access point

FIG. 13

DISTANCE-BASED PHYSICAL RANDOM-ACCESS CHANNEL ROOT SEQUENCE ALLOCATION TO FACILITATE CELL RANGE IMPROVEMENT

TECHNICAL FIELD

The subject disclosure generally relates to embodiments for distance-based physical random-access channel (PRACH) root sequence allocation to facilitate cell range improvement.

BACKGROUND

Current generation (e.g., 5G) wireless communication technologies utilize a PRACH to facilitate a user equipment's (UEs) initial access to a network. For PRACH transmission, different numbers of root sequences and cyclic shifts per root sequence can be used. A minimum numbers of required root sequences, and cyclic shifts per root sequence, are determined so as to generate 64 PRACH preambles for PRACH transmission.

When a user equipment (UE) initially accesses the network, the UE will send one of the 64 PRACH preambles to a gNodeB (gNB). In turn, a PRACH receiver chain of the gNB correlates a corresponding received signal with all of the configured root sequences to detect a preamble peak, in which the peak position determines a preamble index. The computational complexity of a PRACH receiver of the gNB is proportional to the number of configured root sequences that are used for the PRACH transmission.

BRIEF DESCRIPTION OF THE DRAWINGS

Non-limiting embodiments of the subject disclosure are described with reference to the following Figures, in which like reference numerals refer to like parts throughout the various views unless otherwise specified:

FIG. 2 illustrates a block diagram of a distance-based PRACH root sequence allocation system, in accordance with various example embodiments;

FIG. 3 illustrates a block diagram of a user equipment (UE), in accordance with various example embodiments;

FIGS. 6-7 illustrate flow charts of a method associated with a distance-based PRACH root sequence allocation system, in accordance with various example embodiments;

FIGS. 8-10 illustrate flow charts of another method associated with a distance-based PRACH root sequence allocation system, in accordance with various example embodiments;

FIGS. 11-13 illustrate flow charts of a method associated with a UE, in accordance with various example embodiments.

DETAILED DESCRIPTION

Figure 1:
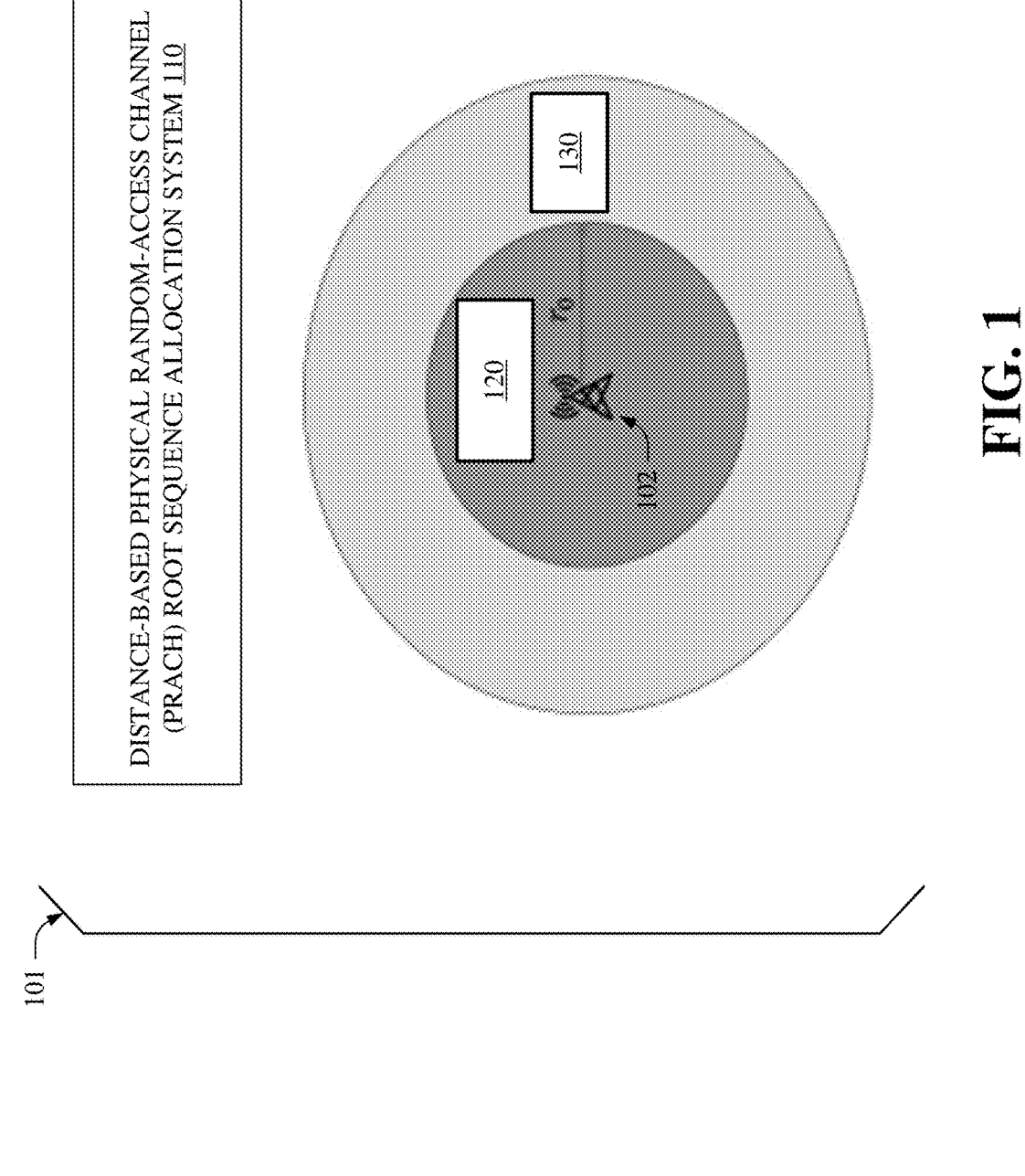
FIG. 1 illustrates a block diagram of a wireless communication environment including a distance-based PRACH root sequence allocation system to facilitate cell range improvement of a wireless access point, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

A supported cell range of a gNB utilizing PRACH technology depends on a detection window size ($N_{cs}$) that is configured by the gNB. Conventional PRACH technologies generate 64 PRACH preambles regardless of the detection window size, and for all UEs within a cell of a gNB, regardless of respective locations of the UEs within the cell.

To increase a cell range of the gNB for a given preamble format, a lower subcarrier spacing (SCS) can be used, or the detection window size of the gNB can be increased. When the detection window size of the gNB is increased, more root sequences are required to generate all 64 preambles for all UEs that are located within a cell range of the gNB—increasing computational complexity of PRACH processing, increasing computational load on the gNB, and introducing large processing delays, e.g., when many root sequences are utilized. Consequently, conventional PRACH technologies have had some drawbacks, some of which may be noted with reference to the various embodiments described herein below.

In various embodiments described herein, a PRACH root sequence allocation system increases a cell range of a gNB—while reducing a computational load on the gNB—by allocating different PRACH detection window sizes to be used by respective groups of UEs based on respective distances of the UEs from the gNB, while limiting an amount of root sequences—and accordingly limiting an amount of PRACH preambles—to be generated by the respective groups of UEs.

For example, in embodiment(s), a system, e.g., a distance-based PRACH root sequence allocation system, performs operations comprising: based on a defined criterion, determining a cell range of a wireless access point, e.g., gNB, which is configured for PRACH-based communications; dividing a defined amount of PRACH root sequences into respective groups of root sequences; allocating a first group of root sequences of the respective groups of root sequences to a first group of user equipments that are located at first respective distances from the wireless access point that are less than or equal to the cell range; allocating a second group of root sequences of the respective groups of root sequences to a second group of user equipments that are located at second respective distances from the wireless access point that are greater than the cell range; determining a first detection window size for first respective PRACH-based communications corresponding to the first group of user equipments; determining a second detection window size for second respective PRACH-based communications corresponding to the second group of user equipments, in which the second detection window size is greater than the first detection window size to facilitate an increase of the cell range of the wireless access point; and receiving, from a user equipment via the second detection window size and the second group of root sequences, a PRACH-based communication to facilitate the increase of the cell range of the wireless access point, in which a distance between the user equipment and the wireless access point has been estimated by the user equipment to be greater than the cell range of the wireless access point.

In other embodiment(s), a method comprises: determining, by a system comprising a processor (e.g., a distance-based PRACH root sequence allocation system), a cell range of a wireless access point that is configured for PRACH-based communications; allocating, by the system, root sequences to respective groups of root sequences, in which a first group of root sequences of the respective groups of root sequences corresponds to a first group of wireless devices that are located at first respective distances from the wireless access point that are greater than the cell range, and in which a second group of root sequences of the respective groups of root sequences corresponds to a second group of wireless devices that are located at second respective distances from the wireless access point that are less than or equal to the cell range; determining, by the system, a first number of cyclic shifts per root sequence for first respective PRACH-based communications that are associated with the first group of wireless devices that are located at the first respective distances from the wireless access point that are greater than the cell range; determining, by the system, a second number of cyclic shifts per root sequence for second respective PRACH-based communications that are associated with the second group of wireless devices that are located at the second respective distances from the wireless access point that are less than or equal to the cell range, in which the first number of cyclic shifts per root sequence for the first respective PRACH-based communications is smaller than the second number of cyclic shifts per root sequence for the second respective PRACH-based communications to facilitate an increase of the cell range of the wireless access point.

In turn, the method comprises: receiving, by the system based on a cyclic shifted version of the first group of root sequences corresponding to the first group of wireless devices that are located at the first respective distances from the wireless access point that are greater than the cell range, a PRACH-based communication from a wireless device that has estimated a distance between the wireless device and the wireless access point to be greater than the cell range of the wireless access point.

In yet other embodiment(s), a method comprises: receiving, by a user equipment comprising a processor, cell range information representing a cell range of a wireless access point and location-based information associated with a position of the wireless access point; receiving, by the user equipment, group root sequence information representing respective groups of physical random-access channel (PRACH)-based root sequences comprising a first group of PRACH-based root sequences and a second group of PRACH-based root sequences, in which the first group of PRACH-based root sequences corresponds to a first group of wireless devices that are located at first respective distances from the wireless access point that are greater than the cell range, and in which the second group of PRACH-based root sequences corresponds to a second group of wireless devices that are located at second respective distances from the wireless access point that are less than or equal to the cell range.

Further, the method comprises: receiving, by the user equipment, detection window information representing a first detection window size for first respective PRACH-based communications corresponding to the first group of wireless devices that are located at the first respective distances from the wireless access point that are greater than the cell range, and a second detection window size for second respective PRACH-based communications corresponding to the second group of wireless devices that are located at the second respective distances from the wireless access point that are less than or equal to the cell range; based on the cell range information and the location-based information, estimating, by the user equipment, a distance between the user equipment and the wireless access point; and in response to determining that the distance is greater than the cell range of the wireless access point, generating, by the user equipment based on the detection window information and the group root sequence information, a PRACH-based communication utilizing the first group of root sequences and the first detection window size, and sending, by the user equipment, the PRACH-based communication to the wireless access point.

As described above, conventional PRACH technologies utilize a large number of root sequences to increase a detection window size of a gNB-increasing a computational complexity of PRACH processing, a computational load on the gNB, and introducing large processing delays. In various embodiments described herein, and now referring to FIGS. 1-2, a distance-based PRACH root sequence allocation system (110) of a wireless communication environment (101) increases a cell range of a gNB by allocating different PRACH detection window sizes to be used by respective groups of UEs based on respective distances of the UEs from a gNB, while limiting an amount of root sequences to be generated by the respective groups of UEs.

The distance-based PRACH root sequence allocation system includes a cell range determination component (210), a PRACH-based communication component (220), a processing component (230), and a memory component (240). In embodiment(s), the memory component stores executable instructions that, when executed by the processing component, facilitate performance of operations by the distance-based PRACH root sequence allocation system, e.g., via the cell range determination component and the PRACH-based communication component.

In this regard, in embodiment(s), the cell range determination component, based on a defined criterion, determines a cell range ($r_0$) of a wireless access point (102) that is configured for PRACH-based communications.

The PRACH-based communication component divides a defined amount of PRACH root sequences into respective groups of root sequences. Further, the PRACH-based communication component allocates a first group of root sequences of the respective groups of root sequences to a first group of user equipments (e.g., 120) that are located at first respective distances from the wireless access point that are less than or equal to the cell range; and allocates a second group of root sequences of the respective groups of root sequences to a second group of user equipments (e.g., 130) that are located at second respective distances from the wireless access point that are greater than the cell range.

Furthermore, the PRACH-based communication component determines a first detection window size for first respective PRACH-based communications corresponding to the first group of user equipments; and determines a second detection window size for second respective PRACH-based communications corresponding to the second group of user equipments, in which the second detection window size is greater than the first detection window size to facilitate an increase of the cell range of the wireless access point.

In turn, the PRACH-based communication component receives, from a user equipment (e.g., 310 described below) via the second detection window size and the second group of root sequences, a PRACH-based communication to facilitate the increase of the cell range of the wireless access point, in which a distance between the user equipment and the wireless access point has been estimated by the user equipment to be greater than the cell range of the wireless access point.

In other embodiment(s), a first total number of PRACH-based preambles is generated, based on the first detection window size via the first group of user equipments utilizing the first group of root sequences, for the first respective PRACH-based communications. Further, a second total number of PRACH-based preambles is generated, based on the second detection window size via the second group of user equipments utilizing the second group of root sequences, for the second respective PRACH-based communications—the first total number of PRACH-based preambles being greater than the second total number of PRACH-based preambles.

In yet other embodiment(s), the PRACH-based communication component divides the defined amount of PRACH root sequences into the respective groups of root sequences by dividing the defined amount of PRACH root sequences into two groups of PRACH root sequences comprising the first group of root sequences and the second group of root sequences.

In embodiment(s), the PRACH-based communication component divides the defined amount of PRACH root sequences into the two groups of PRACH root sequences by dividing equal amounts of the defined amount of PRACH root sequences into the first group of root sequences and the second group of root sequences.

In other embodiment(s), the PRACH-based communication component divides the defined amount of PRACH root sequences into the respective groups of root sequences by dividing the defined amount of PRACH root sequences based on respective geographical distributions of user equipments within the cell range of the wireless access point.

In yet other embodiment(s), the PRACH-based communication component sends, to the user equipment, e.g., via respective system information block (SIB) messages, cell range information representing the cell range of the wireless access point and location-based information associated with a position of the wireless access point—to facilitate an estimation, by user equipment based on the cell range information and the location-based information, of the distance.

In embodiment(s), the location-based information comprises global positioning system (GPS) information representing a location of the wireless access point, or path-loss information representing a signal loss corresponding to the user equipment.

Further, in other embodiment(s), the PRACH-based communication component sends, to the user equipment, information comprising group root sequence information representing the first group of root sequences and the second group of root sequences, and detection window information representing the first detection window size corresponding to the first group of user equipments, and representing the second detection window size corresponding to the second group of user equipments—to facilitate a selection, by the user equipment based on the distance, the group root sequence information, and the detection window information, of the second group of root sequences for generation of the PRACH-based communication.

In yet other embodiment(s), the PRACH-based communication is a first PRACH-based communication, and the PRACH-based communication component receives, from the user equipment via the first detection window size and the first group of root sequences, a second PRACH-based communication, in which the distance between the user equipment and the wireless access point has been estimated by the user equipment to be less than or equal to the cell range of the wireless access point.

In embodiment(s), in response to a failure in the second PRACH-based communication being determined to have occurred, the PRACH-based communication component receives, from the user equipment via the second detection window size and the second group of root sequences, a third PRACH-based communication. In this regard, the failure represents that the user equipment has incorrectly estimated the distance between the user equipment and the wireless access point to be less than or equal to the cell range of the wireless access point.

Now referring to FIG. 3, a block diagram (300) of a user equipment (UE) (310) is illustrated, in accordance with various example embodiments. The user equipment includes a distance estimation component (320), a UE PRACH-based communication component (330), a processing component (340), and a memory component (350). In embodiment(s), the memory component stores executable instructions that, when executed by the processing component, facilitate performance of operations by the UE, e.g., via the distance estimation component and the UE PRACH-based communication component.

In this regard, in embodiment(s), the UE receives cell range information representing a cell range of a wireless access point and location-based information associated with a position of the wireless access point. Further, the UE receives group root sequence information representing respective groups of PRACH-based root sequences comprising a first group of PRACH-based root sequences and a second group of PRACH-based root sequences, in which the first group of PRACH-based root sequences corresponds to a first group of wireless devices (e.g., 130) that are located at first respective distances from the wireless access point that are greater than the cell range, and in which the second group of PRACH-based root sequences corresponds to a second group of wireless devices (e.g., 120) that are located at second respective distances from the wireless access point that are less than or equal to the cell range.

Further, the UE receives detection window information representing a first detection window size for first respective PRACH-based communications corresponding to the first group of wireless devices that are located at the first respective distances from the wireless access point that are greater than the cell range, and a second detection window size for second respective PRACH-based communications corresponding to the second group of wireless devices that are located at second respective distances from the wireless access point that are less than or equal to the cell range.

In turn, based on the cell range information and the location-based information, the distance estimation component estimates a distance between the UE and the wireless access point. Further, in response to determining that the distance is greater than the cell range of the wireless access point, the UE PRACH-based communication component generates, based on the detection window information and the group root sequence information, a PRACH-based communication utilizing the first group of root sequences and the first detection window size, and sends the PRACH-based communication to the wireless access point.

In other embodiment(s), the PRACH-based communication is a first PRACH-based communication, and in response to determining that the distance is less than or equal to the cell range of the wireless access point, the UE PRACH-based communication component generates, based on the detection window information and the group root sequence information, a second PRACH-based communication utilizing the second group of root sequences and the second detection window size, and sends the second PRACH-based communication to the wireless access point.

In yet other embodiment(s), in response to a failure in the second PRACH-based communication being determined to have occurred, the UE PRACH-based communication component generates, based on the detection window information and the group root sequence information, a third PRACH-based communication utilizing the first group of root sequences and the first detection window size, and sends the third PRACH-based communication to the wireless access point.

The following provides further background and details regarding operation of the distance-based PRACH root sequence allocation system with respect to reducing a computational load on a gNB while increasing a cell range of the gNB, in accordance with various example embodiment(s).

For a given PRACH-based preamble format, a larger value of $N_{cs}$ is required to increase a cell range of a gNB that is performing PRACH-based communications with corresponding user equipments. Conventional PRACH-based technologies utilize a common detection window size when generating all preambles for all user equipments communicatively coupled to the gNB, regardless of respective locations of the user equipments within a cell of the gNB—increasing a required number of root sequences for generation all of the preambles, and, consequently, a computational complexity of PRACH processing.

On the other hand, in various embodiment(s) described herein, the distance-based PRACH root sequence allocation system increases the cell range of an eNB by grouping user equipments based on their distance from the gNB. In turn, the distance-based PRACH root sequence allocation system utilizes a subset of the root sequences for generating respective preambles for each group of user equipments-enabling use of a larger detection window size for distant user equipments within the cell (e.g., for user equipments that are located at respective distances within the cell that are greater than the cell range ($r_0$)), while reducing a total amount of available preambles to be utilized by each group of user equipments.

In embodiment(s), the distance-based PRACH root sequence allocation system utilizes PRACH-based preamble format A1 and a subcarrier spacing (SCS) of 30 kHz with parameters given in Table 6.3.3.1 of 3GPP TS 38.211-"5G NR; Physical channel and modulation", version 15.8.0 Release 15—to determine $N_{cs}$ according to the following steps-later determining $r_0$ based on $N_{cs}$:

Step 1: the distance-based PRACH root sequence allocation system computes $$N'_{CS} = \frac{N^{RA}_{cp}}{N_{u,perRepetition}} \times L_{RA},$$

where $$N^{RA}_{cp},$$

8

$N_{u,perRepetition}$, and $L_{RA}$ are obtained from Table 6.3.3.1-2 of 3GPP TS 38.211. Under the given assumptions, i.e., preamble format A1 and SCS=30 k Hz, we have $$N'_{CS} = \frac{N^{RA}_{cp}}{N_{u,perRepetition}} \times L_{RA} = \frac{288}{2048} \times 139 = 19.54.$$

Then, this value is quantized according to Table 6.3.3.1-7 of 3GPP TS 38.211. Hence, $N_{cs}$=19 (corresponding to the zero correlation zone configuration (ZCZC) index of 10 in the table).

Step 2: the distance-based PRACH root sequence allocation system computes the number of cyclic shifts for each root sequence as $$C_v = \left\lfloor \frac{L_{RA}}{N_{cs}} \right\rfloor = \left\lfloor \frac{139}{19} \right\rfloor = 7.$$

Step 3: the distance-based PRACH root sequence allocation system computes the number of required root sequences for generating all the 64 preambles as $$\left\lceil \frac{64}{7} \right\rceil = 10.$$

In turn, the distance-based PRACH root sequence allocation system determines the cell range as $$r_0 = \left( \frac{N_{cs}}{\Delta f_{RA} \times L_{RA}} - \frac{\tau_d}{2^\mu} \right) \times \frac{3 \times 10^8}{2},$$

where $\tau_d$ is the delay spread at 15 kHz. For preamble format A1, $\tau_d$=3.13 μs. Hence, for SCS of 30 kHz, the cell range will be $$r_0 = \left( \frac{19}{30,000 \times 139} - \frac{3.13 \times 10^{-6}}{2} \right) \times \frac{3 \times 10^8}{2} = 448.7 \text{ m}.$$

This cell range of 448.7 meters is achieved using 10 root sequences. Note that since a total of 139 unique root sequences are available for short preambles, and each cell requires 10 root sequences, $$\left\lfloor \frac{139}{10} \right\rfloor = 13$$

cells can be configured using this design.

In response to the distance-based PRACH root sequence allocation system sending the cell range to a user equipment (e.g., 310), the user equipment estimates its distance from the gNB by one of these options: by using the path loss calculated using SIB messages (already an existing feature for all 5G user equipments) such that the distance from the gNB is estimated using the path loss and the free propagation model or other suitable channel models; or by using user equipment GPS information representing a location of the user equipment and gNB GPS information representing a location of the gNB, e.g., provided via an SIB message.

Further, in response to the distance-based PRACH root sequence allocation system sending, to the user equipment, information comprising group root sequence information representing the first group of root sequences (e.g., Group 1) and the second group of root sequences (e.g., Group 2), and detection window information representing the first detection window size corresponding to Group 1, and representing the second detection window size corresponding to Group 2, the user equipment will select the first group of root sequences or the second group of root sequences based on the distance (d) estimated by the user equipment: if $d \leq r_0$, the user equipment will use the first group of root sequences for generating preambles; otherwise, the user equipment will use the second group of root sequences for generating preambles.

In this regard, in response to utilizing the first group of root sequences, the user equipment generates $$\left\lfloor \frac{L_{RA}}{N_{cs}} \right\rfloor \times n_{roots,Group1}$$

preambles. Using this design, the cell range for the first group of user equipments (e.g., 120) will still be equal to $r_0$. Note that $N_{cs}$ is transmitted by the distance-based PRACH root sequence allocation system to the user equipment using the existing higher layer parameter zero correlation zone configuration (ZCZC) index defined in 3GPP technical specifications. For the considered example, a total number of $$\left\lfloor \frac{139}{19} \right\rfloor \times 5 = 7 \times 5 = 35$$

preambles are generated by the user equipment for the first group of root sequences such that each root sequence has 7 preambles.

Figure 4:
FIG. 4 illustrates a table indicating a number PRACH preambles corresponding to respective groups of PRACH root sequences, in accordance with various example embodiments.

In other embodiment(s), and now referring to FIG. 4, table 400 represents various calculations that have been performed by the user equipment for different values of $N_{cs}$ for Group 2, in response to the second group of root sequences being used by the user equipment based on the distance being estimated by the user equipment to be greater than $r_0$.

Figure 5:
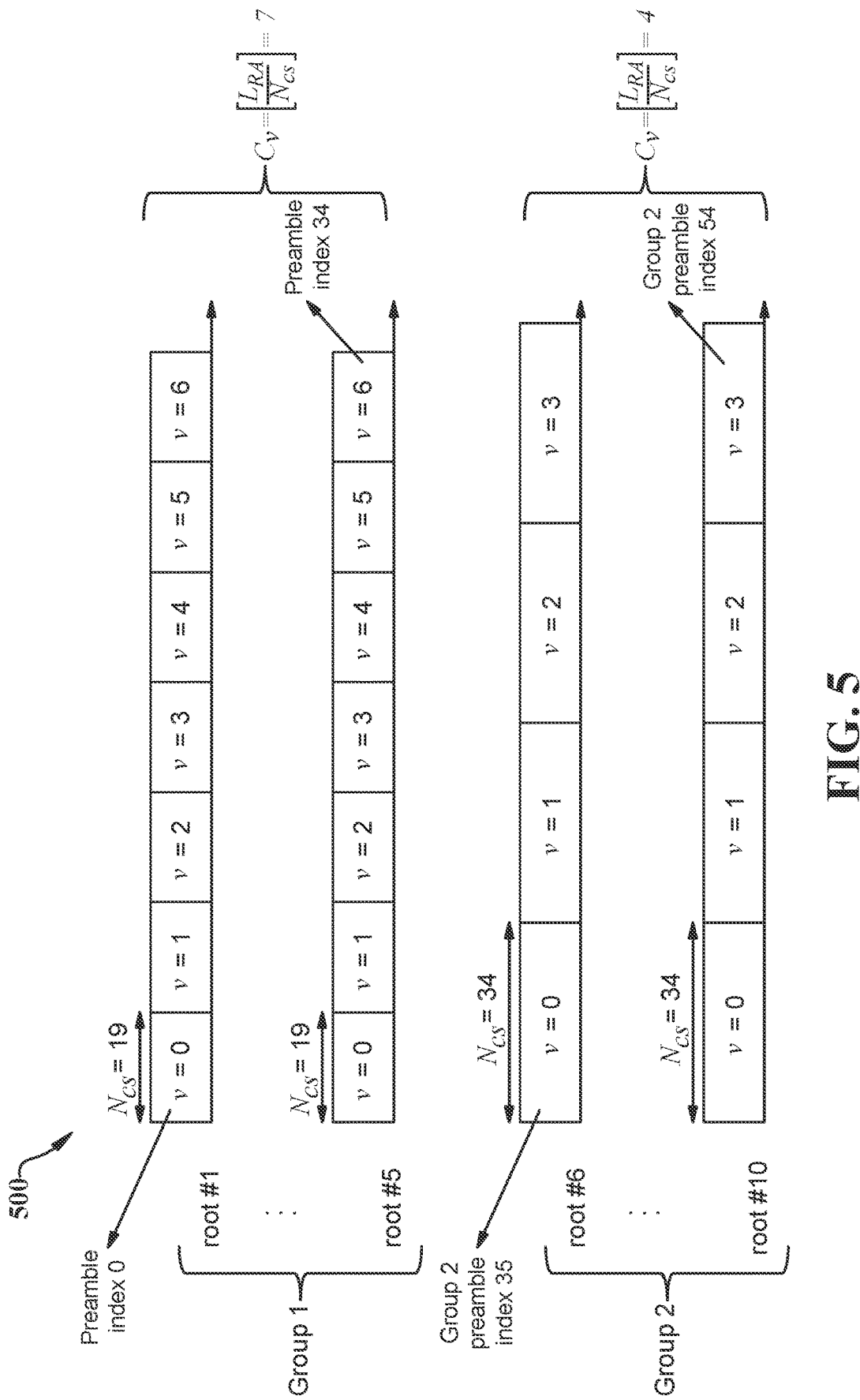
FIG. 5. illustrates groups of root sequences corresponding to respective cyclic shift offsets of a PRACH design, in accordance with various example embodiments.

As represented by table 400, 35 preambles (indexes 0-34) belong to Group 1. Assuming that the configured ZCZC index for Group 2 is 13, the user equipment will consider $N_{cs}=34$ for its PRACH design (500) as illustrated by FIG. 5. Consequently, the total number of preambles for this group will be $$\left\lfloor \frac{139}{34} \right\rfloor \times 5 = 4 \times 5 = 20$$

(using indexes 35-54). Note that preamble indexes shall be a linear number (from 0-63) for both groups of root sequences to avoid contention between the two groups of root sequences due to similar preambles indexes. In turn, the increased (e.g., 120.25%) cell range is given by $$r_0 = \left( \frac{N_{CS}}{\Delta f_{RA} \times L_{RA}} - \frac{\tau_d}{2^\mu} \right) \times \frac{3 \times 10^8}{2} =$$

10

-continued
$$\left( \frac{34}{30,000 \times 139} - \frac{3.13 \times 10^{-6}}{2} \right) \times \frac{3 \times 10^8}{2} = 988.27 \text{ m.}$$

FIGS. 6-13 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIGS. 6-7 illustrate flow charts (600, 700) of a method associated with a system, e.g., a distance-based PRACH root sequence allocation system (110), in accordance with various example embodiments. At 610, based on a defined criterion, the system determines a cell range of a wireless access point that is configured for PRACH-based communications. At 620, the system divides a defined amount of PRACH root sequences into respective groups of root sequences. At 630, the system allocates a first group of root sequences of the respective groups of root sequences to a first group of user equipments that are located at first respective distances from the wireless access point that are less than or equal to the cell range.

At 710, the system allocates a second group of root sequences of the respective groups of root sequences to a second group of user equipments that are located at second respective distances from the wireless access point that are greater than the cell range. At 720, the system determines a first detection window size for first respective PRACH-based communications corresponding to the first group of user equipments. At 730, the system determines a second detection window size for second respective PRACH-based communications corresponding to the second group of user equipments, in which the second detection window size is greater than the first detection window size to facilitate an increase of the cell range of the wireless access point.

At 740, the system receives, from a user equipment via the second detection window size and the second group of root sequences, a PRACH-based communication to facilitate the increase of the cell range of the wireless access point, in which a distance between the user equipment and the wireless access point has been estimated by the user equipment to be greater than the cell range of the wireless access point.

Figure 10:
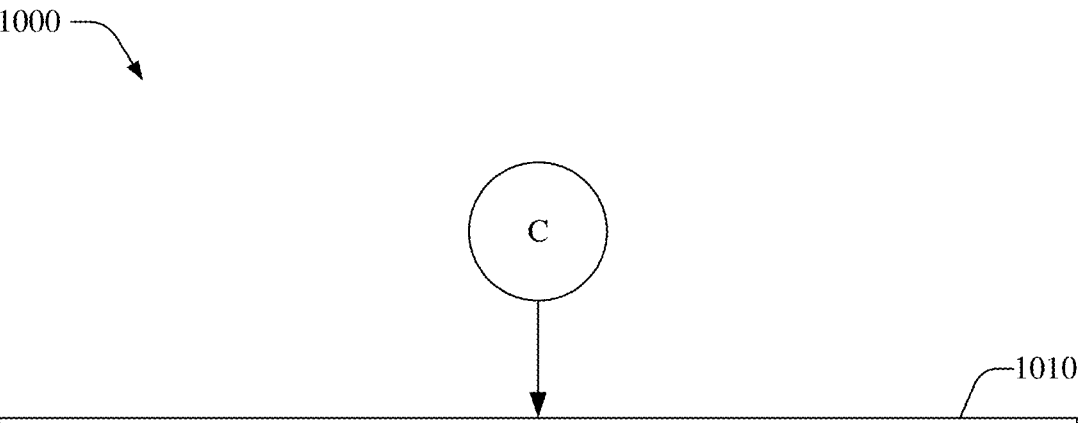

FIGS. 8-10 illustrate flow charts (800-1000) of another method associated with a system, e.g., distance-based PRACH root sequence allocation system (110), in accordance with various example embodiments. At 810, the system determines a cell range of a wireless access point that is configured for PRACH-based communications. At 820, the system allocates root sequences to respective groups of root sequences, in which a first group of root sequences of the respective groups of root sequences corresponds to a first group of wireless devices that are located at first respective distances from the wireless access point that are greater than the cell range, and in which a second group of root sequences of the respective groups of root sequences corresponds to a second group of wireless devices that are located at second respective distances from the wireless access point that are less than or equal to the cell range.

At 830, the system determines a first number of cyclic shifts per root sequence for first respective PRACH-based communications that are associated with the first group of wireless devices that are located at the first respective distances from the wireless access point that are greater than the cell range.

At 910, the system determines a second number of cyclic shifts per root sequence for second respective PRACH-based communications that are associated with the second group of wireless devices that are located at the second respective distances from the wireless access point that are less than or equal to the cell range, in which the first number of cyclic shifts per root sequence for the first respective PRACH-based communications is smaller than the second number of cyclic shifts per root sequence for the second respective PRACH-based communications to facilitate an increase of the cell range of the wireless access point.

At 920, the system receives, based on a first cyclic shifted version of the first group of root sequences corresponding to the first group of wireless devices that are located at first respective distances from the wireless access point that are greater than the cell range, a first PRACH-based communication from a first wireless device that has estimated a first distance between the first wireless device and the wireless access point to be greater than the cell range of the wireless access point.

At 930, the system receives, based on second cyclic shifted version of the second group of root sequences corresponding to the second group of wireless devices, a second PRACH-based communication from a second wireless device that has estimated a second distance between the second wireless device and the wireless access point to be less than or equal to the cell range of the wireless access point.

At 1010, in response to a determination, via the second wireless device, that a failure in the second RACH-based communication has occurred, the system receives, based on the first cyclic shift offset via the first group of root sequences that have been allocated to the first group of wireless devices, a third PRACH-based communication from the second wireless device.

FIGS. 11-13 illustrate flow charts (1100-1300) of a method associated with a user equipment (310), in accordance with various example embodiments. At 1110, the user equipment receives cell range information representing a cell range of a wireless access point and location-based information associated with a position of the wireless access point. At 1120, the user equipment receives group root sequence information representing respective groups of PRACH-based root sequences comprising a first group of PRACH-based root sequences and a second group of PRACH-based root sequences, in which the first group of PRACH-based root sequences corresponds to a first group of wireless devices that are located at first respective distances from the wireless access point that are greater than the cell range, and in which the second group of PRACH-based root sequences corresponds to a second group of wireless devices that are located at second respective distances from the wireless access point that are less than or equal to the cell range.

At 1130, the user equipment receives detection window information representing a first detection window size for first respective PRACH-based communications corresponding to the first group of wireless devices that are located at the first respective distances from the wireless access point that are greater than the cell range, and representing a second detection window size for second respective PRACH-based communications corresponding to the second group of wireless devices that are located at second respective distances from the wireless access point that are less than or equal to the cell range.

At 1210, based on the cell range information and the location-based information, the user equipment estimates a distance between the user equipment and the wireless access point. At 1220, in response to a determination that the distance is greater than the cell range of the wireless access point, the user equipment generates, based on the detection window information and the group root sequence information, a first PRACH-based communication utilizing the first group of root sequences and the first detection window size, and sends the first PRACH-based communication to the wireless access point.

At 1310, in response to a determination that the distance is less than or equal to the cell range of the wireless access point, the user equipment generates, based on the detection window information and the group root sequence information, a second PRACH-based communication utilizing the second group of root sequences and the second detection window size, and sends the second PRACH-based communication to the wireless access point.

At 1320, in response to a determination that a failure in the second PRACH-based communication has occurred, the user equipment generates, based on the detection window information and the group root sequence information, a third PRACH-based communication utilizing the first group of root sequences and the first detection window size, and sends the third PRACH-based communication to the wireless access point.

Reference throughout this specification to "one embodiment," "an embodiment," "another embodiment", "yet another embodiment", "embodiment(s)", "other "embodiment(s)", and "yet other embodiment(s)" means that a particular feature, structure, or characteristic described in connection with the embodiment is included in at least one embodiment. Thus, the appearances of the phrase "in one embodiment," "in an embodiment," "in another embodiment", "in yet another embodiment", "in embodiment(s)", "in other embodiment(s)", and "in yet other embodiment(s)" in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "component", "system", and the like are intended to refer to a computer-related entity, hardware, software (e.g., in execution), middleware, and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

As it is employed in the subject specification, the term "processing component" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "data storage", "data store", "storage space", "data storage device", "storage medium", "memory component", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a memory component (240, 350), non-volatile memory 1422 (see below), disk storage 1424 (see below), and/or memory storage 1446 (see below). Further, nonvolatile memory can be included in read only memory (ROM), programmable ROM (PROM), electrically programmable ROM (EPROM), electrically erasable ROM (EEPROM), or flash memory. Volatile memory (e.g., 1420) can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 14:
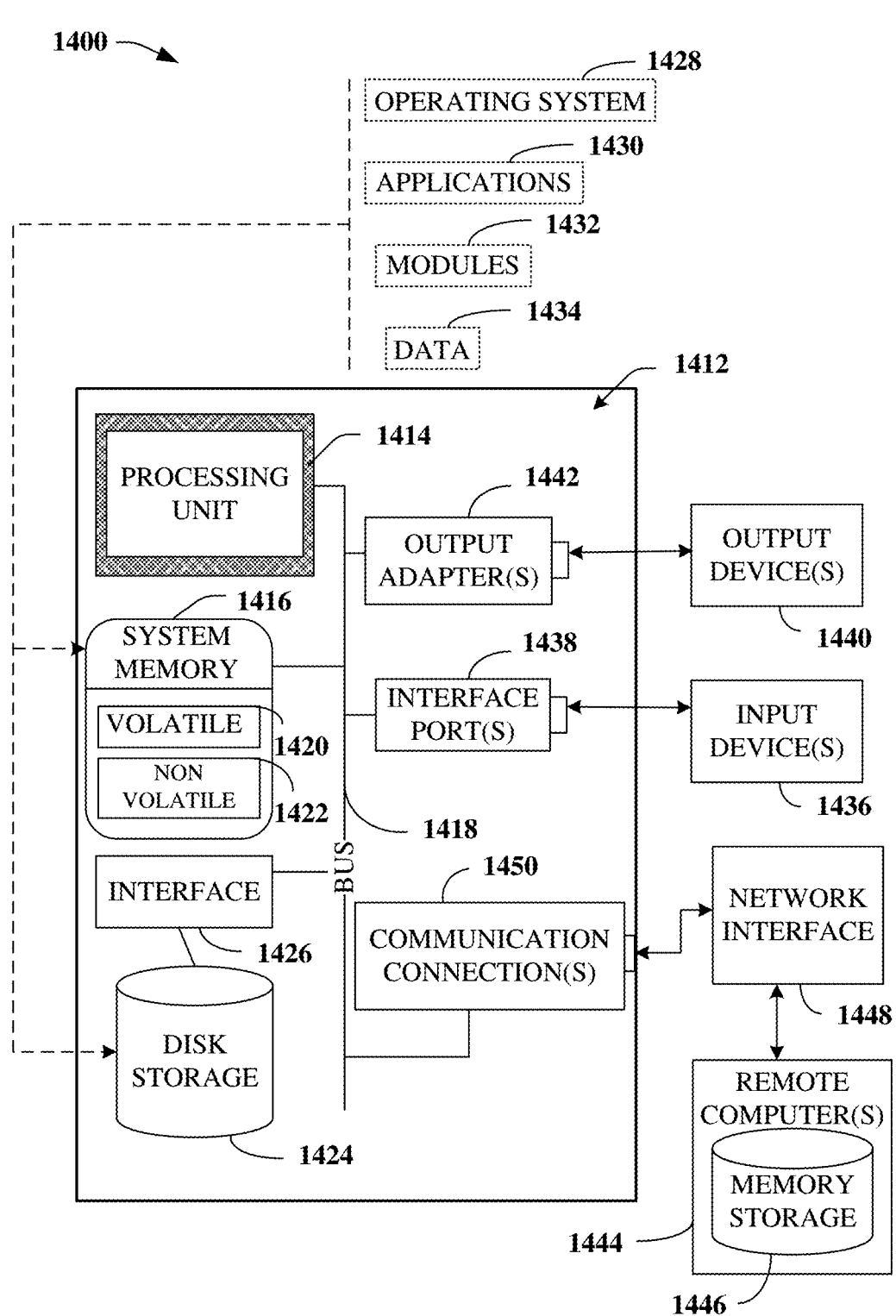
FIG. 14 illustrates a block diagram representing an illustrative non-limiting computing system or operating environment in which one or more aspects of various embodiments described herein can be implemented.

In order to provide a context for the various aspects of the disclosed subject matter, FIG. 14, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, minicomputing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 14, a block diagram of a computing system 1400 operable to execute the disclosed systems and methods, e.g., via wireless communication environment (101), is illustrated, in accordance with an embodiment. Computer 1412 comprises a processing unit 1414, a system memory 1416, and a system bus 1418. System bus 1418 couples system components comprising, but not limited to, system memory 1416 to processing unit 1414. Processing unit 1414 can be any of various available processors. Dual microprocessors and other multiprocessor architectures also can be employed as processing unit 1414.

System bus 1418 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1416 comprises volatile memory 1420 and nonvolatile memory 1422. A basic input/output system (BIOS), containing routines to transfer information between elements within computer 1412, such as during start-up, can be stored in nonvolatile memory 1422. By way of illustration, and not limitation, nonvolatile memory 1422 can comprise ROM, PROM, EPROM, EEPROM, or flash memory. Volatile memory 1420 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also comprises removable/non-removable, volatile/non-volatile computer storage media. FIG. 14 illustrates, for example, disk storage 1424. Disk storage 1424 comprises, but is not limited to, devices like a magnetic disk drive, floppy disk drive, tape drive, Jaz drive, Zip drive, LS-100 drive, flash memory card, or memory stick. In addition, disk storage 1424 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to system bus 1418, a removable or non-removable interface is typically used, such as interface 1426.

It is to be appreciated that FIG. 14 describes software that acts as an intermediary between users, e.g., subscribers, and computer resources described in suitable operating environment 1400. Such software comprises an operating system 1428. Operating system 1428, which can be stored on disk storage 1424, acts to control and allocate resources of computer system 1412. System applications 1430 take advantage of the management of resources by operating system 1428 through program modules 1432 and program data 1434 stored either in system memory 1416 or on disk storage 1424. It is to be appreciated that the disclosed subject matter can be implemented with various operating systems or combinations of operating systems.

A user, e.g., subscriber, can enter commands or information into computer 1412 through input device(s) 1436. Input devices 1436 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1414 through system bus 1418 via interface port(s) 1438. Interface port(s) 1438 comprise, for example, a serial port, a parallel port, a game port, a universal serial bus (USB), a wireless based port, e.g., Wi-Fi, Bluetooth, etc. Output device(s) 1440 use some of the same type of ports as input device(s) 1436.

Thus, for example, a USB port can be used to provide input to computer 1412 and to output information from computer 1412 to an output device 1440. Output adapter 1442 is provided to illustrate that there are some output devices 1440, like display devices, light projection devices, monitors, speakers, and printers, among other output devices 1440, which use special adapters. Output adapters 1442 comprise, by way of illustration and not limitation, video and sound devices, cards, etc. that provide means of connection between output device 1440 and system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. Remote computer(s) 1444 can be a personal computer, a server, a router, a network PC, a workstation, a microprocessor based appliance, a peer device, or other common network node and the like, and typically comprises many or all of the elements described relative to computer 1412.

For purposes of brevity, only a memory storage device 1446 is illustrated with remote computer(s) 1444. Remote computer(s) 1444 is logically connected to computer 1412 through a network interface 1448 and then physically and/or wirelessly connected via communication connection 1450. Network interface 1448 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1450 refer(s) to hardware/software employed to connect network interface 1448 to bus 1418. While communication connection 1450 is shown for illustrative clarity inside computer 1412, it can also be external to computer 1412. The hardware/software for connection to network interface 1448 can comprise, for example, internal and external technologies such as modems, comprising regular telephone grade modems, cable modems and DSL modems, wireless modems, ISDN adapters, and Ethernet cards.

The computer 1412 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1412 can connect to other devices/networks by way of antenna, port, network interface adaptor, wireless access point, modem, and/or the like.

The computer 1412 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable components that, when executed by the at least one processor, facilitate performance of operations by the system, the operations comprising:

based on a defined criterion, determining a cell range of a wireless access point that is configured for physical random-access channel (PRACH)-based communications;

dividing a defined amount of PRACH root sequences into respective groups of root sequences;

allocating a first group of root sequences of the respective groups of root sequences to a first group of user equipments that are located at first respective distances from the wireless access point that are less than or equal to the cell range;

allocating a second group of root sequences of the respective groups of root sequences to a second group of user equipments that are located at second respective distances from the wireless access point that are greater than the cell range;

determining a first detection window size for first respective PRACH-based communications corresponding to the first group of user equipments;

determining a second detection window size for second respective PRACH-based communications corresponding to the second group of user equipments, wherein the second detection window size is greater than the first detection window size to facilitate an increase of the cell range of the wireless access point;

sending, to a user equipment of the second group of user equipments, cell range information representing the cell range of the wireless access point and location-based information associated with a position of the wireless access point to facilitate an estimation, via the user equipment, of a distance between the user equipment and the wireless access point; and in response to the sending of the cell range information and the location-based information, receiving, from the user equipment via the second detection window size and the second group of root sequences, a PRACH-based communication to facilitate the increase of the cell range of the wireless access point, wherein the distance between the user equipment and the wireless access point has been estimated by the user equipment to be greater than the cell range of the wireless access point, and wherein a first total number of PRACH-based preambles that have been generated for the first respective PRACH-based communications is greater than a second total number of PRACH-based preambles that have been generated for the second respective PRACH-based communications.

2. The system of claim 1, wherein the first total number of PRACH-based preambles is generated for the first respective PRACH-based communications based on the first detection window size via the first group of user equipments utilizing the first group of root sequences, and wherein the second total number of PRACH-based preambles is generated for the second respective PRACH-based communications based on the second detection window size via the second group of user equipments utilizing the second group of root sequences.

3. The system of claim 1, wherein the dividing of the defined amount of PRACH root sequences comprises:
dividing the defined amount of PRACH root sequences into two groups of PRACH root sequences comprising the first group of root sequences and the second group of root sequences.

4. The system of claim 2, wherein the dividing of the defined amount of PRACH root sequences into the two groups comprises:
dividing equal amounts of the defined amount of PRACH root sequences into the first group of root sequences and the second group of root sequences.

5. The system of claim 1, wherein the dividing of the defined amount of PRACH root sequences comprises:
dividing the defined amount of PRACH root sequences into the respective groups of root sequences based on respective geographical distributions of user equipments within the cell range of the wireless access point.

6. The system of claim 1, wherein
the user equipment has estimated the distance based on the cell range information and the location-based information, and wherein the location-based information comprises global positioning system information representing a location of the wireless access point or path-loss information representing a signal loss corresponding to the user equipment.

7. The system of claim 6, wherein the operations further comprise:
sending, to the user equipment, information comprising
group root sequence information representing the first group of root sequences and the second group of root sequences, and
detection window information representing the first detection window size corresponding to the first group of user equipments and representing the second detection window size corresponding to the second group of user equipments, wherein the user equipment has selected the second group of root sequences for generation of the PRACH-based communication based on the distance, the group root sequence information, and the detection window information.

8. The system of claim 6, wherein the sending of the information comprises:
sending the information to the user equipment utilizing respective system information block messages.

9. The system of claim 1, wherein the PRACH-based communication is a first PRACH-based communication, and wherein the operations further comprise:
receiving, from the user equipment via the first detection window size and the first group of root sequences, a second PRACH-based communication, wherein the distance between the user equipment and the wireless access point has been estimated by the user equipment to be less than or equal to the cell range of the wireless access point.

10. The system of claim 9, wherein the operations further comprise:
in response to a failure in the second PRACH-based communication being determined to have occurred, receiving, from the user equipment via the second detection window size and the second group of root sequences, a third PRACH-based communication, wherein the failure represents that the user equipment has incorrectly estimated the distance between the user equipment and the wireless access point to be less than or equal to the cell range of the wireless access point.

11. A method, comprising:
determining, by a system comprising at least one processor, a cell range of a wireless access point that is configured for physical random-access channel (PRACH)-based communications;
allocating, by the system, root sequences to respective groups of root sequences, wherein a first group of root sequences of the respective groups of root sequences corresponds to a first group of wireless devices that are located at first respective distances from the wireless access point that are greater than the cell range, and wherein a second group of root sequences of the respective groups of root sequences corresponds to a second group of wireless devices that are located at second respective distances from the wireless access point that are less than or equal to the cell range;
determining, by the system, a first number of cyclic shifts per root sequence for first respective PRACH-based communications that are associated with the first group of wireless devices that are located at the first respective distances from the wireless access point that are greater than the cell range;
determining, by the system, a second number of cyclic shifts per root sequence for second respective PRACH-based communications that are associated with the second group of wireless devices that are located at the second respective distances from the wireless access point that are less than or equal to the cell range, wherein the first number of cyclic shifts per root sequence for the first respective PRACH-based communications is smaller than the second number of cyclic shifts per root sequence for the second respective PRACH-based communications to facilitate an increase of the cell range of the wireless access point;
sending, by the system, cell range information representing the cell range of the wireless access point and location-based information associated with a position of the wireless access point to a wireless device of the first group of wireless devices; and
receiving, by the system based on a cyclic shifted version of the first group of root sequences corresponding to the first group of wireless devices that are located at first respective distances from the wireless access point that are greater than the cell range, a PRACH-based communication from the wireless device that has estimated, based on the cell range information and the location-based information, a distance between the wireless device and the wireless access point to be greater than the cell range of the wireless access point, wherein a first total number of PRACH-based preambles that have been generated for the first respective PRACH-based communications is less than a second total number of PRACH-based preambles that have been generated for the second respective PRACH-based communications.

12. The method of claim 11, wherein the PRACH-based communication is a first PRACH-based communication, wherein the wireless device is a first wireless device, wherein the distance is a first distance, wherein the cyclic shifted version is a first cyclic shifted version, and further comprising:

receiving, by the system based on a second cyclic shifted version of the second group of root sequences corresponding to the second group of wireless devices, a second PRACH-based communication from a second wireless device that has estimated a second distance between the second wireless device and the wireless access point to be less than or equal to the cell range of the wireless access point.

13. The method of claim 12, wherein the receiving of the first PRACH-based communication from the first wireless device further comprises:

receiving, via a first amount of preambles, the first PRACH-based communication, wherein the receiving of the second PRACH-based communication from the second wireless device comprises receiving, via a second amount of preambles, the second PRACH-based communication, wherein the first amount of preambles is less than the second amount of preambles.

14. The method of claim 12, further comprising:

in response to a determination, via the second wireless device, that a failure in the second PRACH-based communication has occurred, receiving, by the system based on the first number of cyclic shifts per root sequence via the first group of root sequences that have been allocated to the first group of wireless devices, a third PRACH-based communication from the second wireless device.

15. The method of claim 11, wherein the allocating of the root sequences further comprises:

allocating equal amounts of root sequences to the respective groups of root sequences.

16. The method of claim 11, wherein the allocating of the root sequences further comprises:

associating the respective groups of root sequences with respective groups of wireless devices comprising the first group of wireless devices and the second group of wireless devices; and allocating the root sequences to the respective groups of root sequences based on respective geographical distributions of wireless devices of the respective groups of wireless devices within the cell range of the wireless access point.

17. The method of claim 11, wherein the sending of the cell range information further comprises:

sending the cell range information via system information block messages.

18. The method of claim 11, further comprising:

sending, by the system to the first wireless device, group root sequence information representing the respective groups of root sequences and cyclic shift information representing the first number of cyclic shifts per root sequence and the second number of cyclic shifts per root sequence, wherein the wireless device has selected, based on the distance, the cyclic shift information, and the group root sequence information, the first group of root sequences from the respective groups of root sequences for generation of the PRACH-based communication.

19. A method, comprising:

receiving, by a user equipment comprising at least one processor, cell range information representing a cell range of a wireless access point and location-based information associated with a position of the wireless access point;

receiving, by the user equipment, group root sequence information representing respective groups of physical random-access channel (PRACH)-based root sequences comprising a first group of PRACH-based root sequences and a second group of PRACH-based root sequences, wherein the first group of PRACH-based root sequences corresponds to a first group of wireless devices that are located at first respective distances from the wireless access point that are greater than the cell range, and wherein the second group of PRACH-based root sequences corresponds to a second group of wireless devices that are located at second respective distances from the wireless access point that are less than or equal to the cell range;

receiving, by the user equipment, detection window information representing a first detection window size for first respective PRACH-based communications corresponding to the first group of wireless devices that are located at the first respective distances from the wireless access point that are greater than the cell range, and a second detection window size for second respective PRACH-based communications corresponding to the second group of wireless devices that are located at second respective distances from the wireless access point that are less than or equal to the cell range;

based on the cell range information and the location-based information, estimating, by the user equipment, a distance between the user equipment and the wireless access point; and in response to determining that the distance is greater than the cell range of the wireless access point, generating, by the user equipment based on the detection window information and the group root sequence information, a first PRACH-based communication utilizing the first group of root sequences and the first detection window size, and sending, by the user equipment, the first PRACH-based communication to the wireless access point, wherein a first amount of preambles corresponding to the first PRACH-base communication is less than a second amount of preambles corresponding to a second PRACH-based communication that has been generated by the user equipment in response to the distance being determined to be less than or equal to the cell range of the wireless access point.

20. The method of claim 19, further comprising:

in response to determining that the distance is less than or equal to the cell range of the wireless access point, generating, by the user equipment based on the detection window information and the group root sequence information, the second PRACH-based communication utilizing the second group of root sequences and the second detection window size, and sending, by the user equipment, the second PRACH-based communication to the wireless access point.

\* \* \* \* \*